US007016424B1

(12) United States Patent
Huber et al.

(10) Patent No.: US 7,016,424 B1
(45) Date of Patent: Mar. 21, 2006

(54) METHOD AND CIRCUIT LAYOUT FOR THE TRANSMISSION OF MESSAGES BY MEANS OF APPROXIMATING HERMITIAN FUNCTIONS

(75) Inventors: Klaus Huber, Darmstadt (DE); Karl-Heinrich Hofmann, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/485,596

(22) PCT Filed: Jul. 16, 1998

(86) PCT No.: PCT/EP98/04434

§ 371 (c)(1),
(2), (4) Date: Oct. 16, 2000

(87) PCT Pub. No.: WO99/09656

PCT Pub. Date: Feb. 25, 1999

(30) Foreign Application Priority Data

Aug. 13, 1997 (DE) ................................. 197 35 097

(51) Int. Cl.
H04L 27/00 (2006.01)
H04L 27/06 (2006.01)
(52) U.S. Cl. ....................................... 375/259; 375/340
(58) Field of Classification Search ................ 375/130, 375/140, 141, 147, 259, 260, 261, 279, 280, 375/281, 285, 322, 329, 332, 340; 370/208, 370/210, 320, 335, 342, 441
See application file for complete search history.

(56) References Cited

U.S. PATENT DOCUMENTS

| 4,730,344 | A | * | 3/1988 | Saha | 375/280 |
|---|---|---|---|---|---|
| 5,175,743 | A | * | 12/1992 | Crespo et al. | 370/210 |
| 5,761,346 | A | | 6/1998 | Moody | |
| 5,862,182 | A | * | 1/1999 | Awater et al. | 375/279 |
| 6,169,723 | B1 | * | 1/2001 | Fertner et al. | 370/210 |
| 6,356,555 | B1 | * | 3/2002 | Rakib et al. | 370/441 |

FOREIGN PATENT DOCUMENTS

EP         0 340 853        11/1989

OTHER PUBLICATIONS

Norbert Wiener, *The Fourier Integral and Certain of its Applications*, Cambridge: Cambridge University Press, pp. 51-55.
John M. Wozencraft et al., *Principles of Communication Engineering*, New York: John Wiley & Sons, pp. 223-228.
Richard A. Haddad, "A New Orthogonal Transform for Signal Coding", IEEE Transactions on Acoustics, Speech and Signal Processing, vol. 36, No. 9, pp. 1404-1411.

* cited by examiner

Primary Examiner—Betsy L. Deppe
(74) Attorney, Agent, or Firm—Kenyon & Kenyon (57) ABSTRACT

A method and circuit arrangement for transmission of messages in which a number of L components ($m_0, \ldots, m_{L-1}$) are coded by means of orthogonal functions to a signal (s(t)), and in which approximations of hermitic functions are used as orthogonal functions. A Fourier transform is performed on the received signal and subsequently decoded with the aid of the orthogonal functions.

11 Claims, 8 Drawing Sheets

Coding, using a coding device at a transmission side, each of the at least one message using a respective orthogonal function so as to form a transmission signal, each respective orthogonal function being an approximation of a respective Hermite function

34

Recovering, using a demodulation device at a receiving side, the at least one message from a received signal via a decoding using the respective Hermite function, the demodulation device including a Fourier-transform device for performing a Fourier transform on the received signal before the decoding, and including a respective first decoder unit corresponding to each of the at least one message, each respective first decoder unit including a respective first multiplier, a respective first integrator and a respective first discriminator connected in series, wherein each respective first decoder unit is for decoding the received signal in a time domain and wherein the demodulation device further includes a respective second decoder unit associated with each respective first decoder unit, each respective second decoder unit being for decoding the received signal in a frequency domain and including a respective second multiplier, a respective second integrator and a respective second discriminator connected in series

METHOD AND CIRCUIT LAYOUT FOR THE TRANSMISSION OF MESSAGES BY MEANS OF APPROXIMATING HERMITIAN FUNCTIONS

FIELD OF THE INVENTION

The present invention relates to a method and circuit arrangement for transmitting messages, the messages being coded by orthogonal functions to form a signal.

RELAYED TECHNOLOGY

Methods for transmitting messages using coding by orthogonal functions have been used. Thus, in practice, frequent use is made of sinusoidal and cosinusoidal functions as orthogonal base functions for coding a number of messages to form a common signal. Reference is made to the book entitled *"Principles of Communication Engineering"*, Wozencraft, Jacobs, Wiley, New York 1965, which is herewith incorporated by reference herein, for the theory of these methods.

A method and a device for transmitting messages using Hermite functions as orthogonal functions are described in European Patent Document No. EP 0 340 853.

The aim in transmitting messages is to make the signals to be transmitted immune to interference and to provide means at the receiving side which filter out interference.

SUMMARY OF THE INVENTION

An object of the present invention is to specify a method and circuit arrangement which permits a high transmission rate in conjunction with a reduction in the interference susceptibility.

The present invention provides a method for transmitting at least one message, the method including coding each of the at least one message using a respective orthogonal function so as to form a transmission signal, each respective orthogonal function being an approximation of a respective Hermite function. A Fourier transform is performed on a received signal, and then the Fourier transformed received signal is decoded using the respective orthogonal function so as to obtain the at least one message. Use is made of the property that, except for a multiplicative constant, Hermite functions do not change during a Fourier transform.

In an advantageous further development of the present invention, the received signal is subjected to a Fourier transform and subsequently decoded with the aid of the Hermite functions. In this case, use is made of the property that, except for a multiplicative constant, Hermite functions do not change during a Fourier transform.

An advantageous further development of the present invention provides for the received signal to be filtered before and/or after the Fourier transform, in order to eliminate possibly included interference components.

In one advantageous further development of the invention, the received signal is decoded both in the time domain and in the frequency domain. That is to say, on the one hand, the received signal is fed directly to the decoding and, on the other hand, is first of all subjected to a Fourier transform and then decoded.

In an advantageous further development of the invention, in each case one of the two decoded signals in the time domain and in the frequency domain, respectively, is selected.

One advantageous further development of the invention provides for one of the two signals present in the time domain and in the frequency domain to be selected on the basis of all signals present.

The present invention also provides a circuit arrangement for transmitting at least one message, the circuit arrangement including a coding device at a transmission side for coding each of the at least one message using a respective orthogonal function so as to form a transmission signal, each respective orthogonal function being an approximation of a respective Hermite function. A demodulation device is included at a receiving side for recovering the at least one message from a received signal via a decoding using the respective Hermite function. The demodulation device includes a Fourier-transform device for performing a Fourier transform on the received signal before the decoding.

In an advantageous further development of the present invention, the demodulation device has a number of multipliers, integrators and discriminators corresponding to the number of dimensions or linear factors, one multiplier, one integrator and one discriminator, respectively, being connected in series to form an evaluation unit. A multiplier and an integrator form a correlator.

In one advantageous further development of the invention, provision is made for a Fourier-transform device which subjects the received signal to a Fourier transform and the time domain, and the other evaluation unit is fed the signal in the frequency domain. Instead of two evaluation units, it is optionally possible to use only one with a multiplex technique.

BRIEF DESCRIPTION OF THE DRAWINGS

The invention will now be explained in more detail on the basis of exemplary embodiments with reference to the drawing, in which.

DETAILED DESCRIPTION

Figure 1:
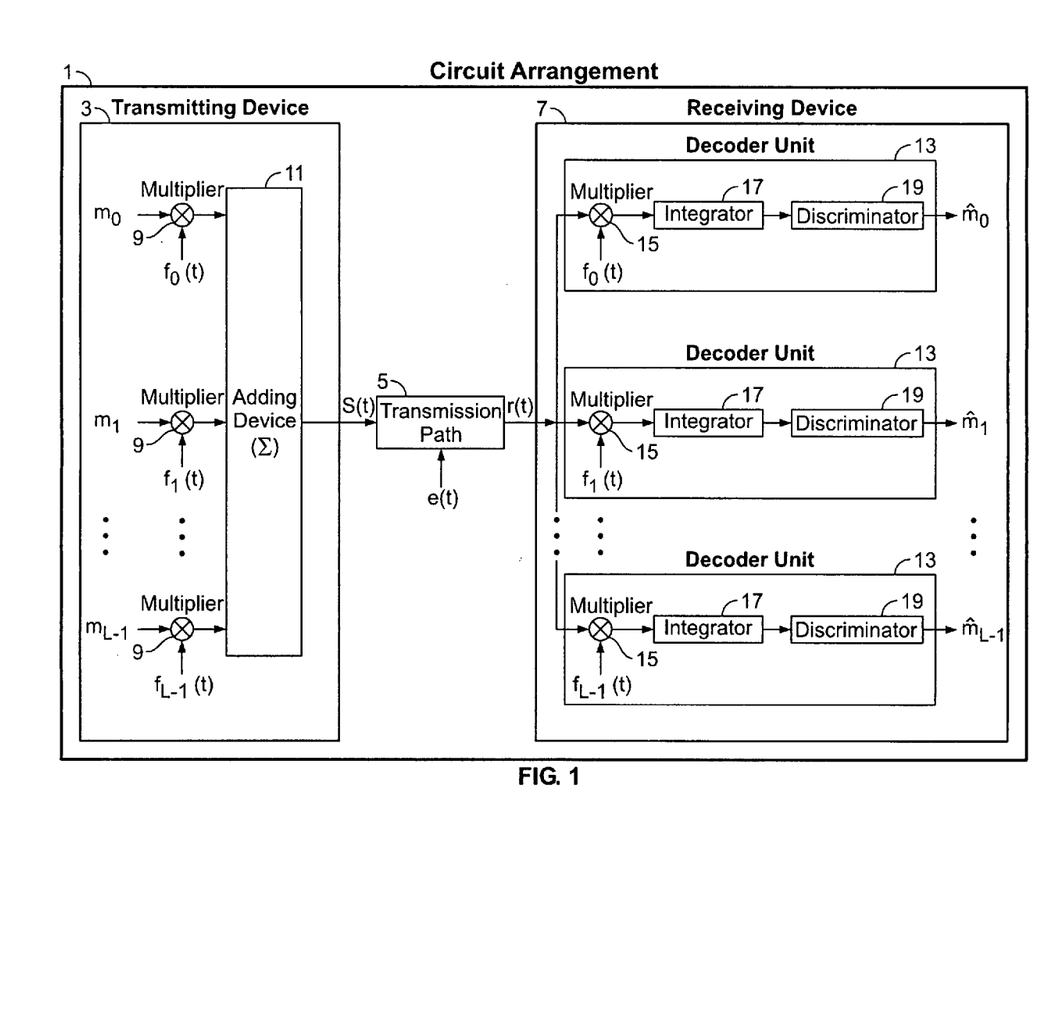
FIG. 1 shows a schematic representation of a first exemplary embodiment of a circuit arrangement.

FIG. 1 shows a circuit arrangement which is suitable for transmitting and receiving messages. It includes a transmitting device 3 which transmits signals to a receiving device 7, for example, via a transmission channel 5. Transmitting device 3 includes a plurality of, in the present exemplary embodiment, a number L of multipliers 9, which with the aid of orthogonal functions $f_0(t)$ to $f_{L-1}(t)$, map the message $\underline{m}=(m_0, \ldots, M_{L-1})$ to be coded. The output signals of multipliers 9 are fed to an adding device 11 which generates signal s(t) to be transmitted. Signal s(t) can therefore be represented as a linear combination of orthogonal base functions as follows:

$$s(t)=m_0f_0(t)+m_1f_1(t)+\ldots+m_{L-1}f_{L-1}(t).$$

Functions $f_0(t)$ to $f_{L-1}(t)$ are orthogonal functions which satisfy the following rule:

$$\int_{-T/2}^{+T/2} f_i(t)f_j(t)dt = \begin{Bmatrix} \text{const} \cdot & i=j \\ 0 & \text{otherwise} \end{Bmatrix},$$

T being the orthogonality interval. Since the orthogonality interval of the Hermite functions extends over an infinite time interval, the Hermite functions must be approximated by technically realizable functions.

Functions f(t) are usually standardized in such a way that the constant is equal to 1. The term orthonormal functions is also used in this case.

It is indicated in FIG. 1 that signal s(t) to be transmitted encounters interference on transmission path 5, the interference signal being denoted by e(t).

Receiving device 7 includes a number of decoder units 13 corresponding to the number of the dimensions contained in signal s(t). In the present exemplary embodiment, a number L of decoder units 13 is provided. Each of decoder units 13 includes a multiplier 15, an integrator 17 and a discriminator 19. The aforesaid subassemblies are connected in series, the output signal of multiplier 15 being fed to the integrator, and the output signal of the integrator being fed to discriminator 19, which then provides the decoded component $\hat{m}_j$.

Each of decoder units 13 is fed a signal r(t) which is composed of transmitted signal s(t) and interference signal e(t). Owing to the orthogonality of the functions used for modulation, components $m_j$ can be recovered from transmitted signal s(t) in a simple manner by calculating the integral $$\int_{-T/2}^{+T/2} S(t)f_j(t)dt$$

This integration is carried out by integrators 17. Since signal r(t) received by receiving device 7 has an interference component e(t), the signal made available by integrators 17 in accordance with the equation $$\int_{-T/2}^{+T/2} r(t)f_j(t)dt$$

where r(t)=s(t)+e(t)

also contains an interference component. The downstream discriminator 19 now has the task of determining the best possible estimated value for message $m_j$ from the defective signal supplied by integrator 17.

In addition to the already mentioned property of orthogonality, functions $f_0(t)$ to $f_{L-1}(t)$ used for modulation are distinguished by the fact that they remain unchanged in the case of a Fourier transform, except for a multiplicative constant. Such functions are the Hermite functions, and are defined as follows:

$$f_n(X) = \frac{H_n(X)e^{-\frac{x^2}{2}}}{\sqrt{2^n n!}\sqrt{n}}$$

$H_n(x)$ being the Hermite polynomials, for which it holds that:

$$H_n(X) = (-1)^n e^{x^2} \frac{d^n}{dx^n} e^{-x^2}$$

Figure 5:
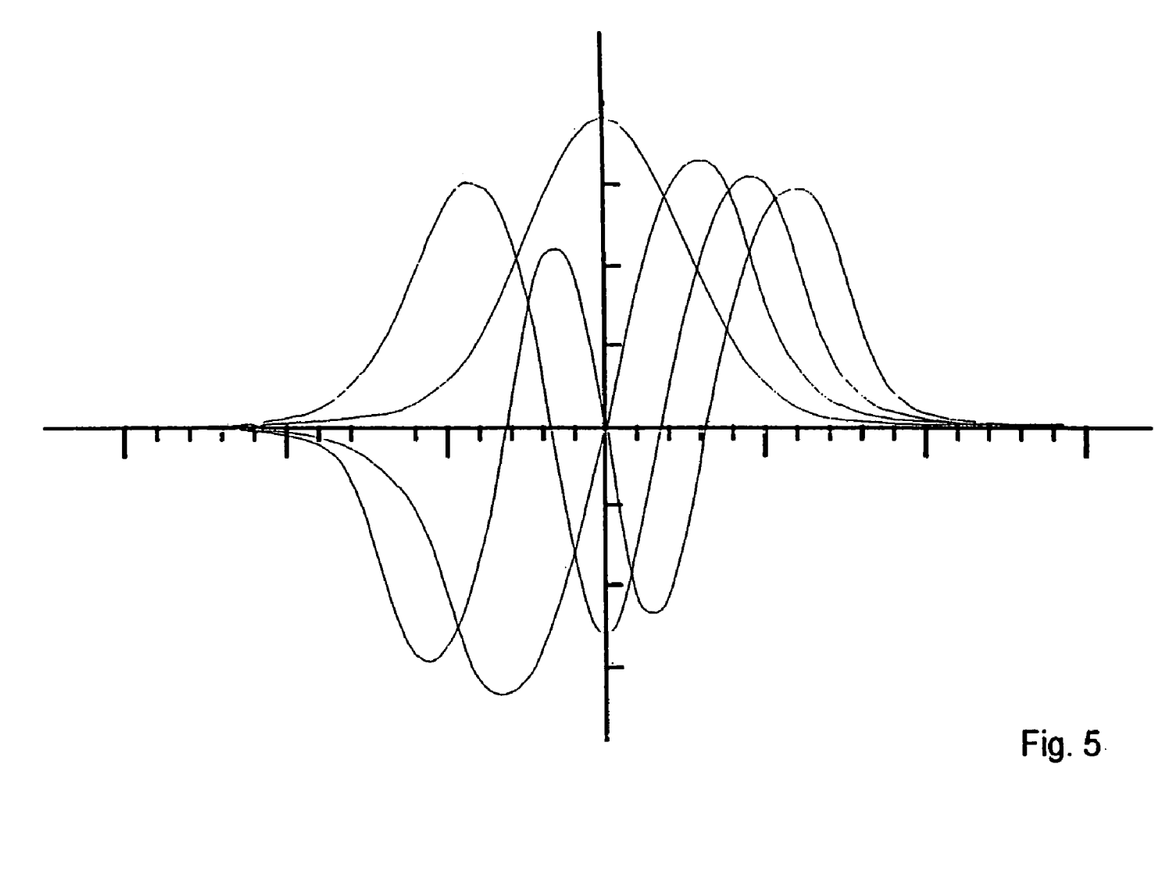
FIG. 5 shows a graphical representation of the first five Hermite functions.

A graphical representation of the first five Hermite functions is shown in FIG. 5.

The strong exponential decay of the functions is clearly to be seen. This property permits, in a simple way, a technically realizable approximation of the functions which are then fed to multipliers 9 and 15. A detailed description of the mentioned Hermite functions can be found in the book entitled "The Fourier Integral and Certain of Its Applications", N. Wiener, Cambridge University Press, Cambridge 1933, reprinted 1988 which is herewith incorporated by reference herein.

Figure 2:
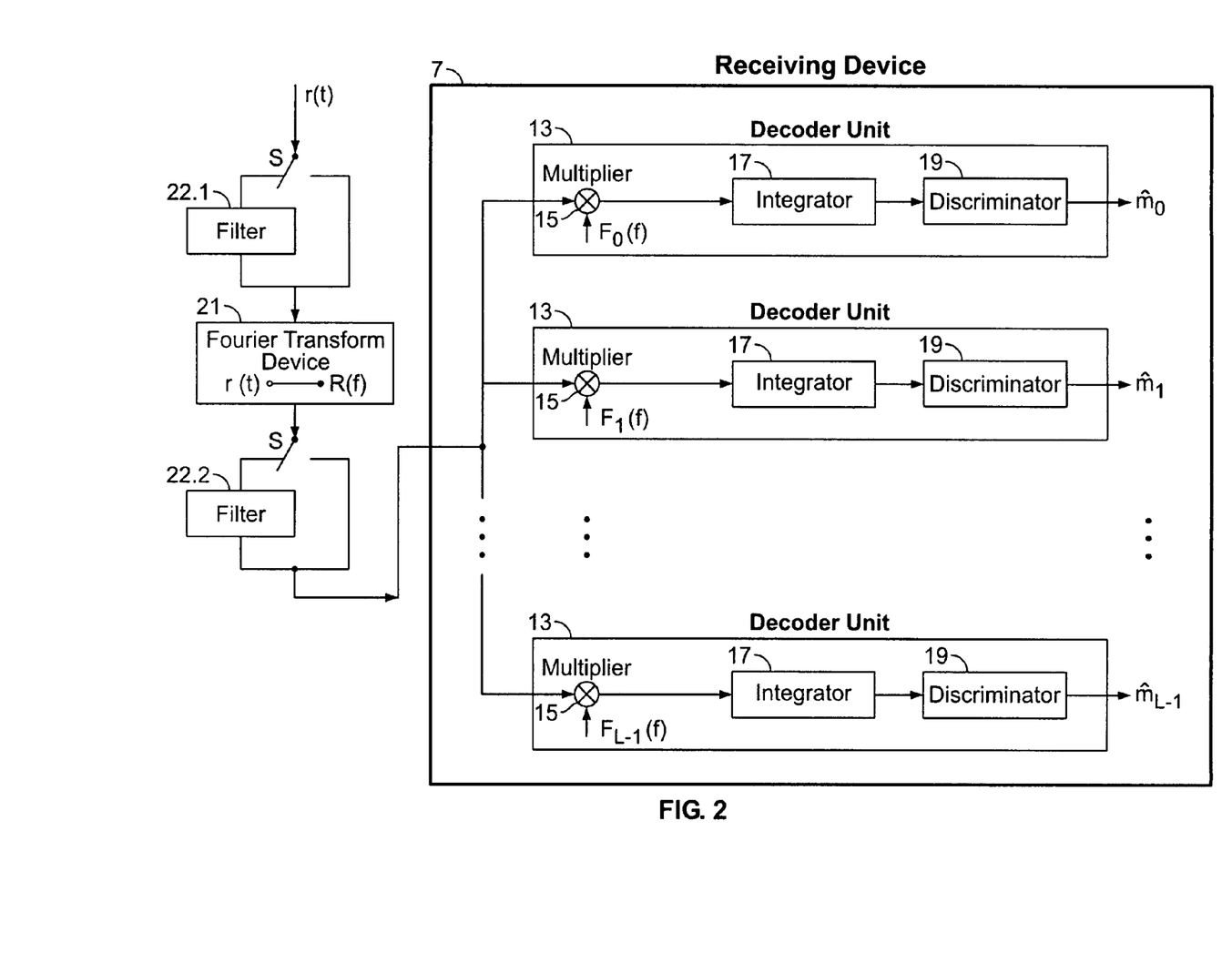
FIG. 2 shows a schematic representation of the receiving side of a further exemplary embodiment.

FIG. 2 shows a second exemplary embodiment of a receiving device 7, which corresponds essentially to the receiving device described and shown in FIG. 1. A description of the parts marked with the same reference symbols is therefore dispensed with. By contrast with receiving device 7 already described, in the present exemplary embodiment, provision is made for a Fourier-transform device 21 which transforms received signal r(t) into the frequency domain and then feeds this transformed signal to multipliers 15. A first filter 22.1 is connected upstream of Fourier-transform device 21, and a second filter 22.2 is connected downstream of it. The schematically illustrated switches S are intended to indicate that the two filters 22.1, 22.2 can be used optionally. The two filters themselves are preferably low-pass or band-pass filters.

Because signal s(t) containing the message is represented in the base band as a linear combination of Hermite functions, this signal s(t) is essentially not changed by the Fourier transform of Fourier-transform device 21. The result of this is that decoder units 13 can be designed in accordance with the decoder units specified in FIG. 1. Functions $F_0(f)$ to $F_{L-1}(f)$ fed to multipliers 15 differ from time functions $f_0(t)$ to $f_{L-1}(t)$ specified in FIG. 1 only by a multiplicative constant whose value is equal to +/−1 or +/−i, i being the root of −1, provided that the Fourier transform is defined, as in the book by Wiener, as $$F(f) = \frac{1}{\sqrt{2\pi}} \int_{-\infty}^{+\infty} f(t)e^{-ift} dt$$

Other definitions of the Fourier transform are likewise possible, mutatis mutandis. The definition used here is the mathematically simplest one in this case. Note, however, that the symbol f differs by a factor from the customary frequency.

The interference e(t) contained in received signal r(t) can be filtered out to a certain extent by filter 22.1 upstream of Fourier-transform device 21, the signal components of the orthogonal Hermite functions remaining essentially unchanged. A contribution to further reducing the interference component is made by second filter 22.2, which is connected downstream of Fourier-transform device 21 and eliminates further interference components by a further filtering operation.

Figure 3:
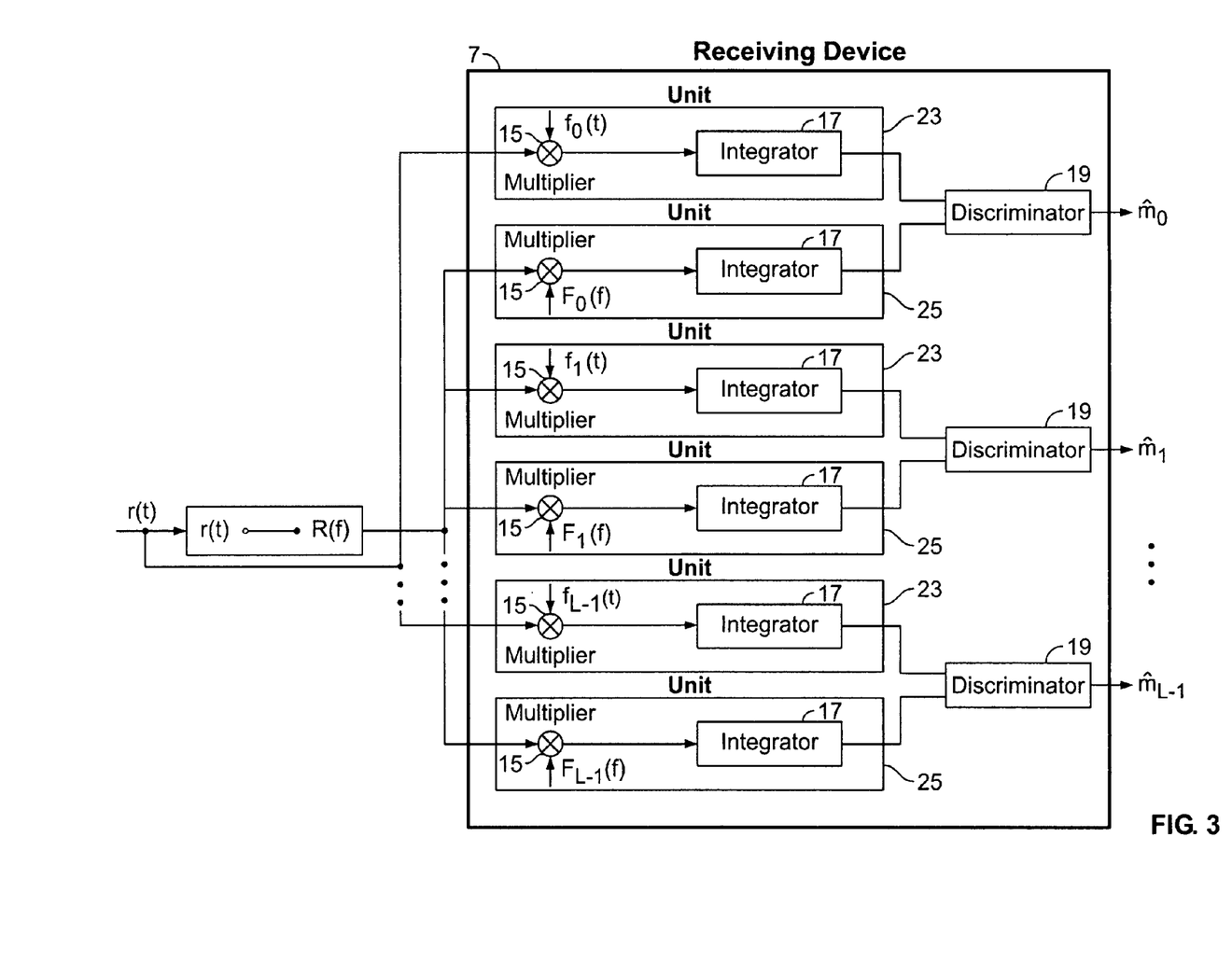
FIG. 3 shows a schematic representation of the receiving side of a further exemplary embodiment.

A further exemplary embodiment of a receiving device 7 is shown in FIG. 3. The design corresponds essentially to that of the receiving device according to FIG. 2, so that a repeated description of the parts marked with the same reference symbols is omitted. In contrast with the above-named exemplary embodiment, in each case two units, composed of a multiplier 15 and integrator 17, are allocated to each discriminator 19. In each case, one of these units 23 is fed signal r(t) directly, while the respective other unit 25 receives the output signal of Fourier-transform device 21. The result of this is therefore a combination of receiving devices 7 shown in FIG. 1 and in FIG. 2, discriminator 19 being required to fulfil the task of selecting the best of the two fed output signals of integrators 17 and making it available as components $\hat{m}_j$. Discriminator 19 determines the best estimated value from the two fed signals in the time domain and in the frequency domain on the basis of a suitable metric, for example, the Euclidian metric.

Figure 4:
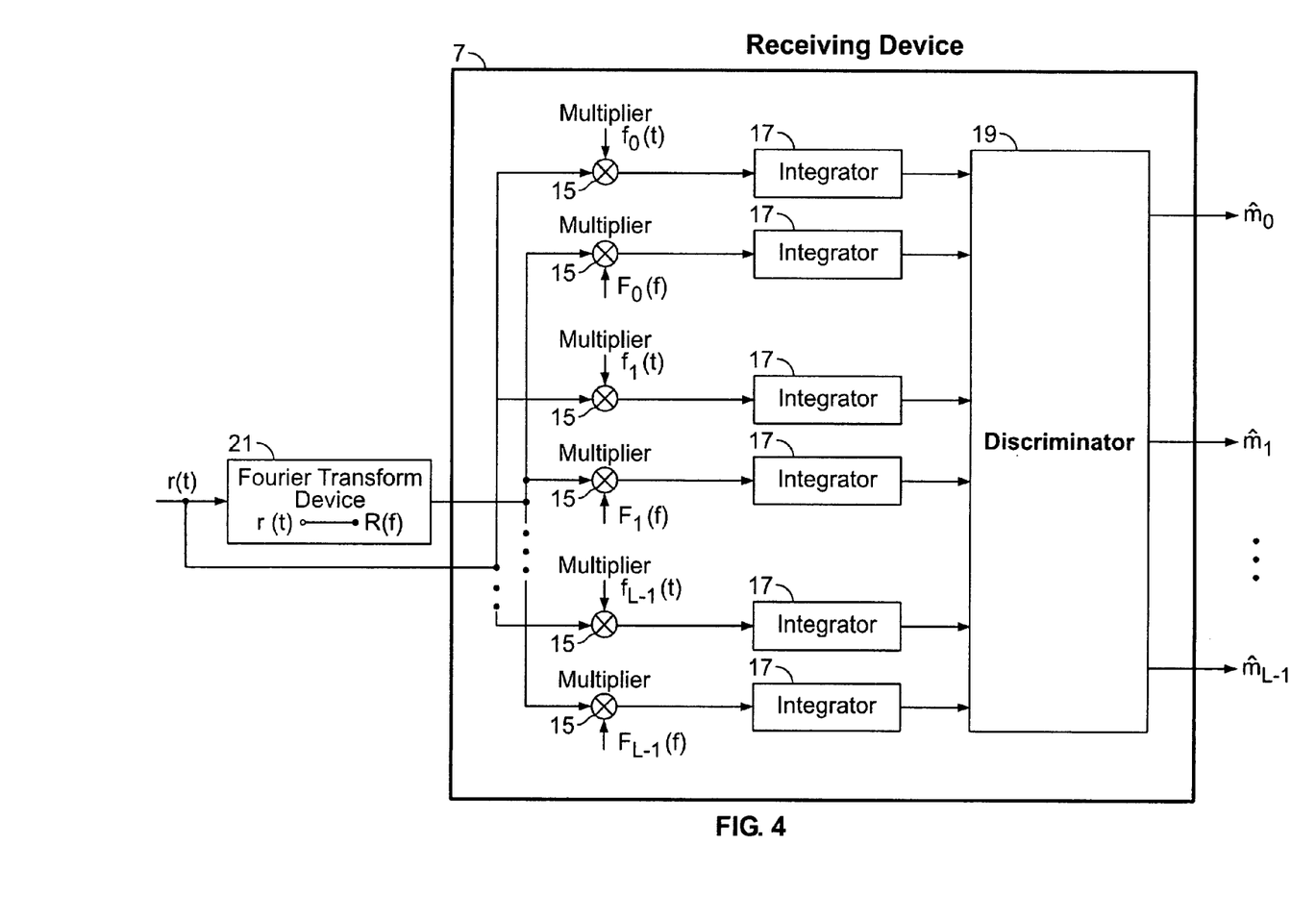
FIG. 4 shows a schematic representation of the receiving side of a further exemplary embodiment.

Shown in FIG. 4 is a further exemplary embodiment of receiving device 7 which corresponds essentially to the exemplary embodiment according to FIG. 3. By contrast, in receiving device 7 according to FIG. 4, a discriminator 19' is provided to which is fed the output signals of all the integrators 17 and which, on the basis of all the signals, estimates and outputs components $m_0$ to $M_{L-1}$ using a suitable metric, for example, the Euclidian metric, once again. This receiving device makes it possible for components $\hat{m}_o$ to $\hat{m}_{L-1}$, decoded from disturbed signal r(t), to have a very small interference component.

Figure 6:
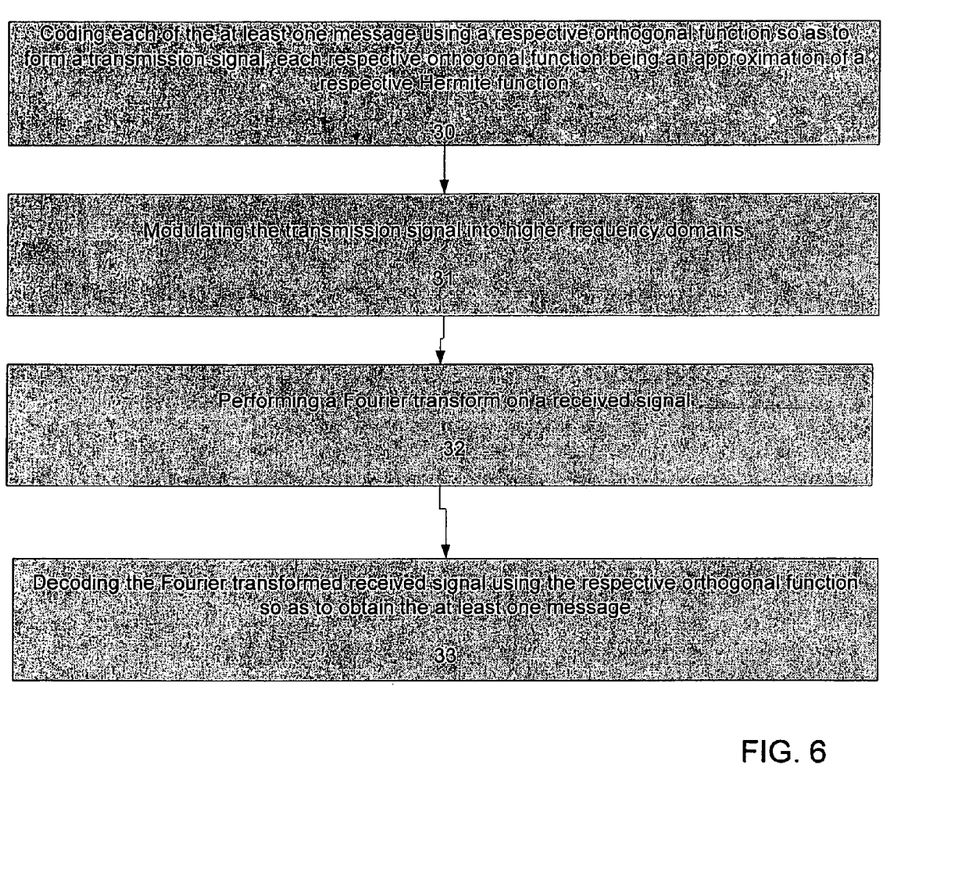
FIG. 6 shows an exemplary method of the present invention.

FIG. 6 shows a method for transmitting at least one message including the steps of coding each of the at least one message using a respective orthogonal function so as to form a transmission signal, each respective orthogonal function being an approximation of a respective Hermite function 30; modulating the transmission signal into higher frequency domains 31; performing a Fourier transform on a received signal 32; and decoding the Fourier transformed received signal using the respective orthogonal function so as to obtain the at least one message 33.

Figure 7:
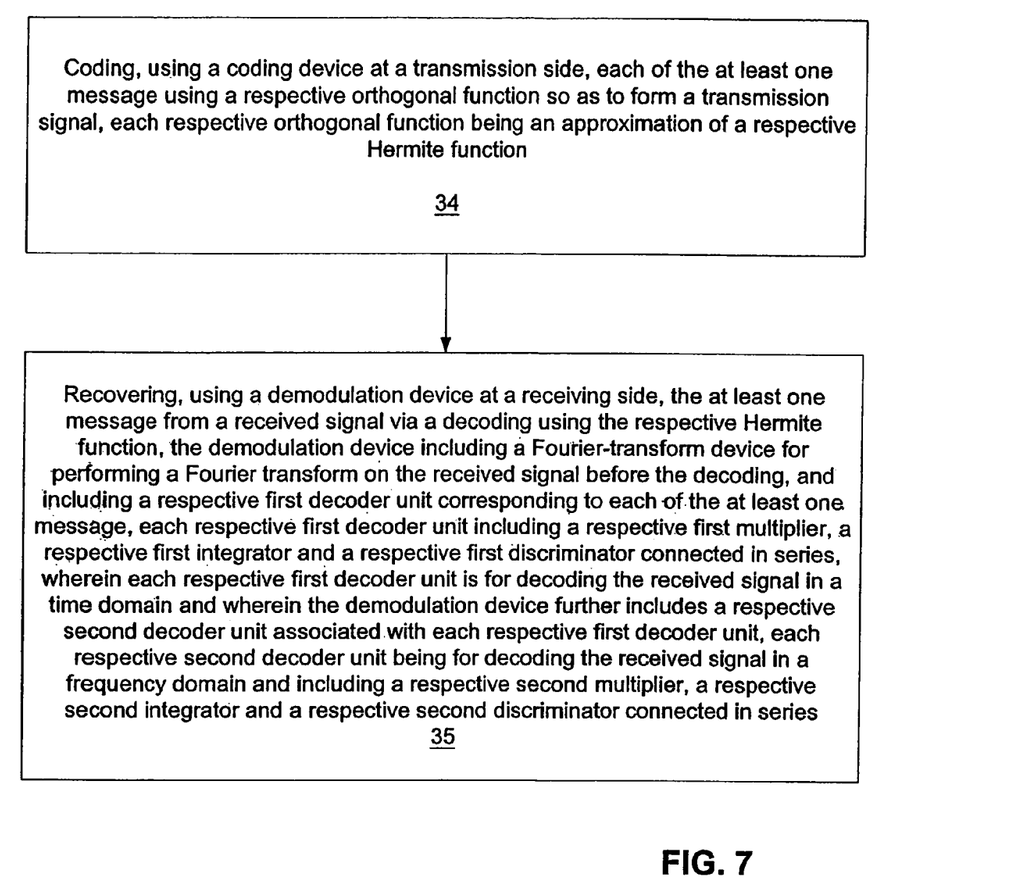
FIG. 7 shows another exemplary method of the present invention.

FIG. 7 shows a method for transmitting at least one message, including the steps of coding, using a coding device at a transmission side for coding, each of the at least one message using a respective orthogonal function so as to form a transmission signal, each respective orthogonal function being an approximation of a respective Hermite function 34; and recovering, using a demodulation device at a receiving side, the at least one message from a received signal via a decoding using the respective orthogonal function, the demodulation device including a Fourier-transform device for performing a Fourier transform on the received signal before the decoding. The demodulation device may include a respective first decoder unit corresponding to each of the at least one message, each respective first decoder unit including a respective first multiplier, a respective first integrator and a respective first discriminator connected in series. Each respective first decoder unit may be used for decoding the signal in a time domain. The demodulation device further may include a respective second decoder unit associated with each respective first decoder unit, each respective second decoder unit being for decoding the signal in a frequency domain and including a respective second multiplier, a respective second integrator and a respective second discriminator connected in series.

Figure 8:
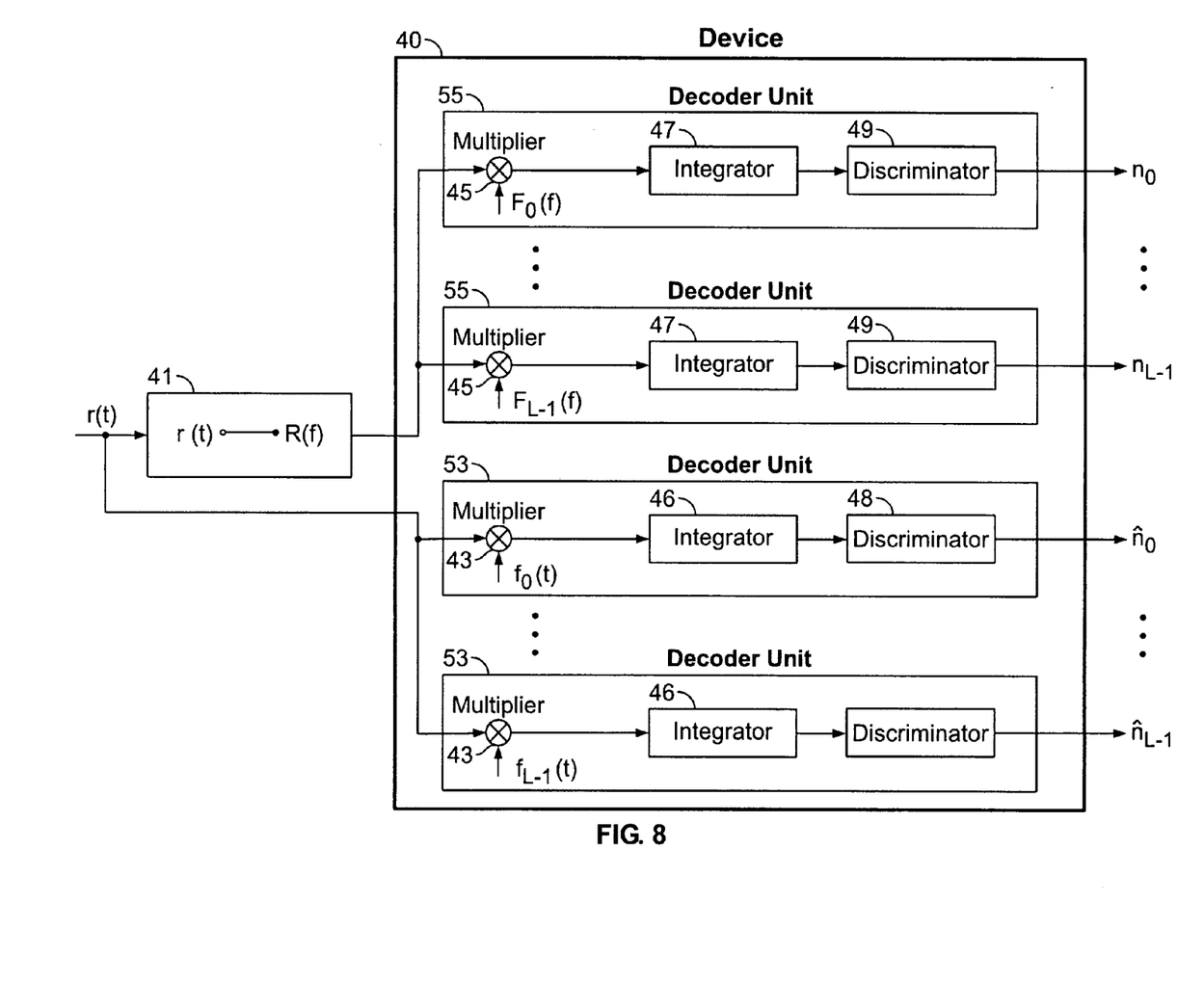
FIG. 8 shows a schematic representation of the present invention.

FIG. 8 shows an exemplary embodiment of a device 40 having parts of which are similar to FIGS. 1 and/or 2. Provision is made for a Fourier-transform device 41 which transforms received signal r(t) into the frequency domain and then feeds this transformed signal to multipliers 45 in decoder units 55. The decoder unit 55 has a multiplier 45 in series with an integrator 47 in series with a discriminator 49, to provide output component $n_0 \ldots n_{L-1}$. The received signal r(t) of the time domain is fed to multipliers 45 in decoder units 53. The decoder unit 53 has a multiplier 43 fed in series to an integrator 46 in series with a discriminator 48, to provide output component $\hat{n}_0 \ldots \hat{n}_{L-1}$.

It is common to all the above-mentioned exemplary embodiments that an additional filtering can be performed in the frequency domain owing to the use of Hermite functions to code the message, because these Hermite functions are not essentially changed by the Fourier transform. Thus, interference in the decoded messages is reduced.

Of course, it is possible to combine individual exemplary embodiments; for example, the two filters 22.1, 22.2 shown in FIG. 2 can also be used in the exemplary embodiments according to FIGS. 3 and 4. Moreover, it is conceivable for signal s(t) to be transformed into higher frequency domains in a known way by modulation. It is also conceivable for the exemplary embodiment shown in FIG. 3 to be modified in such a way that, instead of two respective units 23, provision is made for only one unit 23 which is then alternately fed, via a multiplexer, the signal in the time domain and the signal in the frequency domain.

What is claimed is:

1. A method for communicating at least one message, the method comprising:
coding each of the at least one message using a respective orthogonal function so as to form a transmission signal, each respective orthogonal function being an approximation of a respective Hermite function;
performing a Fourier transform on a received signal; and then decoding the Fourier transformed received signal using the respective orthogonal function so as to obtain the at least one message.

2. The method as recited in claim 1 further comprising filtering the received signal at least one of before and after the performing of the Fourier transform.

3. The method as recited in claim 2 wherein the filtering includes a low-pass filtering.

4. The method as recited in claim 1 wherein the decoding is performed in both a time domain and a frequency domain.

5. The method as recited in claim 4 wherein the decoding provides at least a time domain result and a frequency domain result and further comprising applying a metric to the time domain result and the frequency domain result so as to select one of the results.

6. The method as recited in claim 5 wherein the metric includes a Euclidian metric.

7. The method as recited in claim 1 further comprising modulating the transmission signal into higher frequency domains.

8. A circuit arrangement for communicating at least one message, the circuit arrangement comprising:
a coding device at a transmission side for coding each of the at least one message using a respective orthogonal function so as to form a transmission signal, each respective orthogonal function being an approximation of a respective Hermite function; and
a demodulation device at a receiving side for recovering the at least one message from a received signal via a decoding using the respective orthogonal function, the demodulation device including a Fourier-transform device for performing a Fourier transform on the received signal before the decoding.

9. The circuit arrangement as recited in claim 8 wherein the demodulation device further includes a respective first decoder unit corresponding to each of the at least one message, each respective first decoder unit including a respective first multiplier, a respective first integrator and a respective first discriminator connected in series.

10. The circuit arrangement as recited in claim 9 wherein each respective first decoder unit is for decoding the received signal in a time domain and wherein the demodulation device further includes a respective second decoder unit associated with each respective first decoder unit, each respective second decoder unit being for decoding the received signal in a frequency domain and including a respective second multiplier, a respective second integrator and a respective second discriminator connected in series.

11. The circuit arrangement as recited in claim 8 wherein the demodulator further includes a respective discriminator corresponding to each of the at least one message and a respective first and second evaluator unit connected to each respective discriminator, the first evaluator unit for decoding the signal in a time domain and including a respective first multiplier and a respective first integrator connected in series, the second evaluator unit for decoding the signal in a frequency domain and including a respective second multiplier and a respective second integrator connected in series.

* * * * *